United States Patent [19]

Tuvim et al.

[11] Patent Number: 5,421,491
[45] Date of Patent: Jun. 6, 1995

[54] MEASURING AND DISPENSING DEVICE

[76] Inventors: Yuri Tuvim, 22 Jenson St., Newton, Mass. 02160; Yury Sherman, 511 Beech St., Roslindale, Mass. 02131

[21] Appl. No.: 206,925

[22] Filed: Mar. 7, 1994

[51] Int. Cl.⁶ .............................................. B65D 88/54
[52] U.S. Cl. ...................................... 222/336; 222/361
[58] Field of Search ............... 222/325, 336, 361, 366, 222/181, 461, 561

[56] References Cited

U.S. PATENT DOCUMENTS

| | | | |
|---|---|---|---|
| 1,455,970 | 5/1923 | Resek | 222/361 |
| 1,471,621 | 10/1923 | McCord | 222/361 |
| 1,904,756 | 4/1933 | Wooster | 222/361 |
| 3,072,299 | 1/1963 | Sessions et al. | 222/181 |
| 3,185,190 | 5/1965 | Crawford | 222/361 |
| 3,193,159 | 7/1965 | Swindler | 222/336 |

FOREIGN PATENT DOCUMENTS

| | | | |
|---|---|---|---|
| 264115 | 4/1988 | European Pat. Off. | 222/561 |
| 28150 | 1/1925 | France | 222/361 |
| 337743 | 4/1959 | Switzerland | 222/361 |

*Primary Examiner*—Andres Kashnikow
*Assistant Examiner*—Philippe Derakshani

[57] ABSTRACT

A household device for measuring and dispensing granular materials such as coffee, sugar and the like including set of adapters for receiving different canisters in which the granular material is normally sold or stored and a transporting mechanism for delivering a granular material from a receiving opening of the device to its dispensing opening. The transporting mechanism includes a slide having a lock which prevents the slide being fully withdrawn from a housing of the device and a compression spring(s) which effects a back stroke of the slide. The device is operated as a press-type mechanism that is convenient for users, especially for elderly and handicapped people.

9 Claims, 2 Drawing Sheets

MEASURING AND DISPENSING DEVICE

FIELD OF THE INVENTION

The present invention relates to the measuring and dispensing household device for granular materials such as instant coffee, sugar, salt and the like. More particularly, it relates to device for dispensing predetermined volume of granular materials from canisters in which these materials are normally sold or stored.

BACKGROUND OF THE INVENTION

Various types of devices, combining dispensing and measuring functions, have been developed in the past. Examples of prior art include U.S. Pat. Nos. 2,077,980 to Bell; 2,080,311 to Henley; 2,207,120 to Greig; 2,553,509 to Altorfer; 2,555,459 to Seufer; 2,767,889 to Manrose; 2,852,167 to Lempart; 3,056,532 to Germano; 3,276,637 to Fender; 3,458,092 to Connel; 4,130,149 to Hausam.

Prior art design measuring and dispensing device for granular materials has some or all of the following drawbacks:
- necessity to pour granular materials to be dispensed from a canister in which these materials normally sold to a special canister;
- complexity of assemble and disassemble of the device for cleaning;
- inconvenience of operation, especially for elderly and/or handicapped people.

With these drawbacks, the advantages of prior art measuring and dispensing devices are largely offset by their disadvantages.

SUMMARY OF THE INVENTION

The present invention is a measuring and dispensing device which, however, avoids the disadvantages of prior art and introduces additional useful properties.

The device includes a transporting mechanism which is manually inserted by user into and moved along a passageway in a housing of the inventive device. The mechanism provides delivery of a desirable granular material from a supply container to a discharge opening of the device. A slide of the transporting mechanism has a material receiving opening which is sized to adopt a predetermined volume of granular material pouring from a supply canister. The slide also includes a handle at its outer end to facilitate insertion into the passageway and for convenience of pushing the slide ahead at a working stroke. A back stroke of the device is provided with a spring unit which includes one or more compression springs. Use of the compression spring(s) makes the device easy for operation that is very essential for elderly and handicapped people.

In order to prevent the slide from being fully withdrawn from the housing of the device at the back stroke, the transporting mechanism of the inventive device has a lock means which comprises an elastic latch cantilevered from the slide. A tip of the latch protrudes out of a contour of the slide. At the working stroke, when the slide is moved to the discharging position, the tip is pressed by the inner wall of the housing into the opening of the slide and does not interfere with the movement of the slide. At the back stroke the latch moves upward because of its restoring force and hits the wall of the housing which restricts further movement of the slide.

There is a sealing means which provides an air-tight connections of elements of the device.

A set of funnel-shaped interchangeable adapters is used. Each adapter can be releasably secured in the housing of the device. It also has means for receiving a predetermined type of canister in which the granular material is normally sold or stored. The funnel shape of the adapter provides a complete evacuation of the granular material from the canister. In order to operate the device, the canister that contains the granular material, is screwed onto the adapter and then turned over.

The construction and the operation of the inventive device is explained in detail in the description of preferred embodiments which is accompanied by the following drawings. The invention is set forth as to its novelty in the appended claims.

BRIEF DESCRIPTION OF THE INVENTION

DETAIL DESCRIPTION OF THE PREFERRED EMBODIMENT

Figure 3:
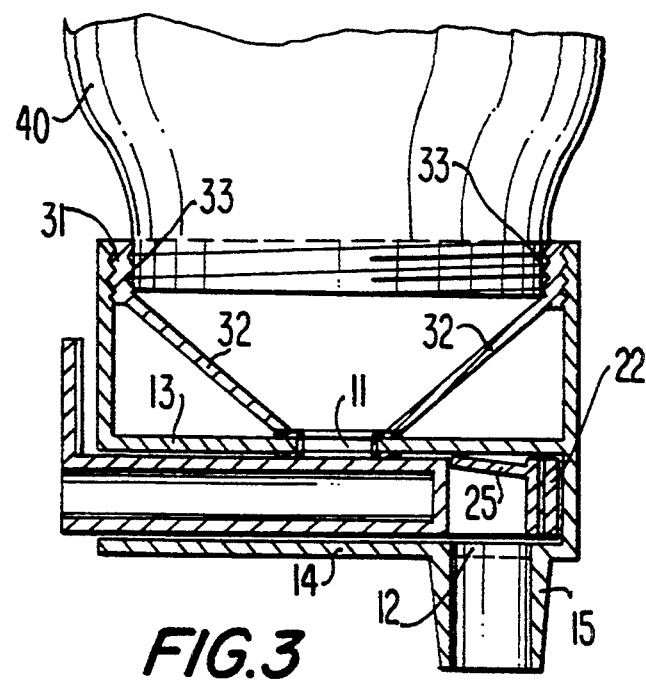
FIG. 3 is a cross-sectional view of the device in it's discharging position.
Figure 1:
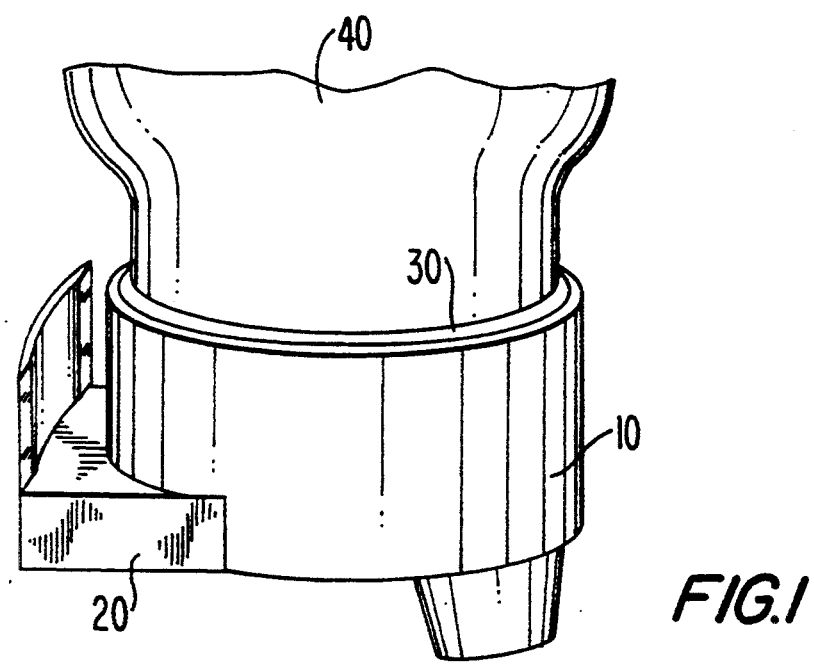
FIG. 1 is a perspective view of a dispenser of the present invention.

As can be seen from FIGS. 1 through 5, the inventive device consists of a housing 10, transporting mechanism 20 and a set of funnel-shaped adapters (only one of which is shown in figures).

The housing 10 includes a material receiving opening 11 and a discharge opening 12. A material receiving opening 11 is formed at an inner flat wall 13 of the housing. The granular material passes into the housing through the opening 11 from a container 40 and adapter 30. A discharge opening 12 is formed at an outer flat wall 14 and leads to an extending nozzle 15 through which the material is dispensed. The openings 11 and 12 are interconnected by a lateral passageway 16 into which the transporting mechanism 20 is being placed.

The housing 10 includes also a circular flange 17, the interior portion of which has a thread 18 for receiving the adapter 30. of a suitable low friction plastic material, surrounds opening 11. One of the functions of the sealing means is to provide a tight connection of the housing 10 and the adapter 30 to prevent a penetration of the granular materials into a blind space 50, between the housing and the adapter. Another function of the sealing means 19 is to provide an air-tight connection of the housing 10 and the transporting mechanism 20 and, therefore, to protect of the quality of the stored/dispensed material over time. It is especially important for such materials as coffee and other aromatic products. In order to reduce friction, a portion of the sealing means between the housing and the transporting mechanism is made in a form of bristle.

Figure 5:
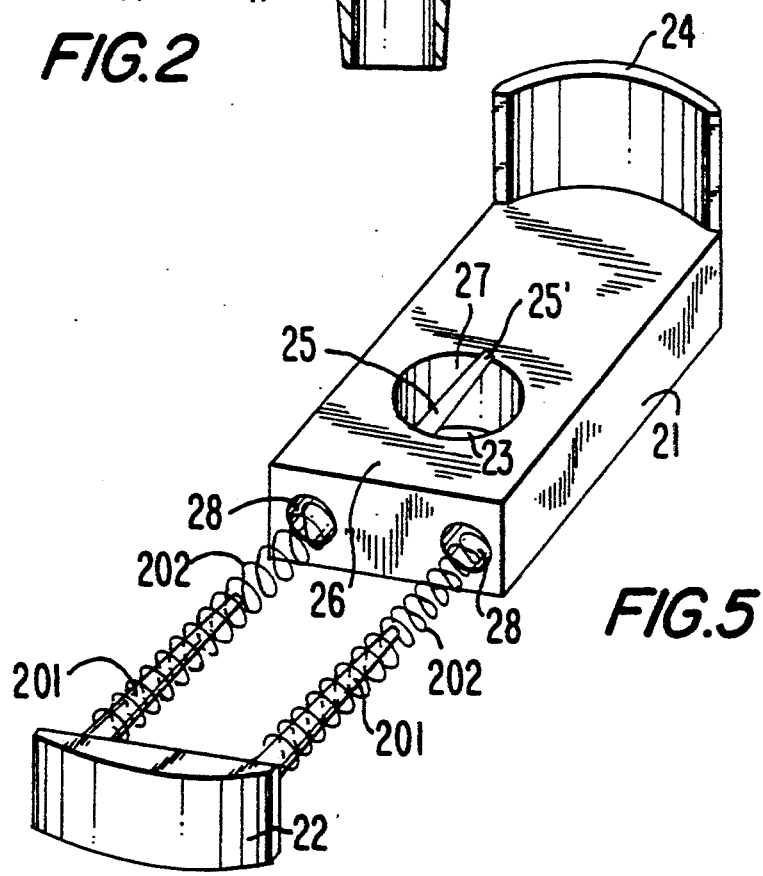
FIG. 5 is an isometric view of the transporting mechanism.

The transporting mechanism 20 includes a slide 21 and a spring unit 22 (FIG. 5).

Figure 2:
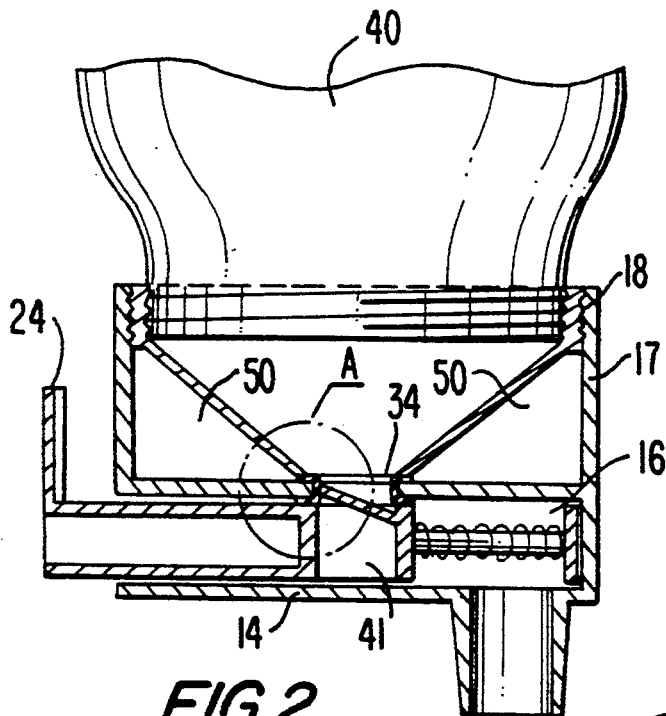
FIG. 2 is a cross-sectional view of the device in it's filling position.

The reciprocable slide 21 includes an opening 23, preferably in a form of a cylinder with main axis substantially perpendicular to the passageway 16. In combination with the surfaces 13 and 14 of the housing, the opening 23 defines a movable compartment 41 which accommodates a predetermined volume of the granular material. FIGS. 2 and show a loading and a discharging positions of the compartment 41. There is a handle 24 at the outer end of the slide 21 for pushing the slide as seen in FIGS. 2 and 3.

Figure 4:
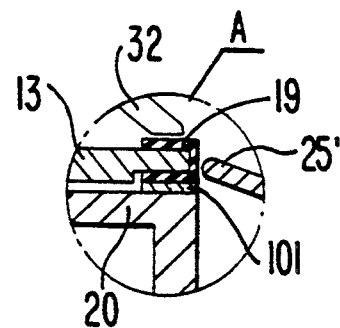
FIG. 4 is a fragmentary sectional view showing an engagement of a slide, a lock means, an adapter and a housing in a preferred embodiment of the present invention.

In order to prevent the slide 21 from being fully withdrawn from the passageway 16 in the housing at a back stroke, the slide is provided with a lock means (FIGS. 2,4 and 5). The lock is an elastic latch 25 cantilevered from a wall 26 of the opening 23 at the end of the slide 21 which is opposite to the handle 24. The elastic latch 25 is directed toward the handle 24 and inclined, somewhat upwardly, so that its tip 25' is out of a contour of the slide 21 (FIG. 5). There is a small gap between the tip 25' of the latch and a vertical surface 27 of the opening 23, so the tip 25' is movable up and down relative to the opening 23.

At the working stroke, when the slide 21 is moved to the discharging position, as shown in FIG. 3, the tip 25' is pressed by the inner flat wall 13 of the housing 10 into the opening 23 of the slide and does not interfere with the movement of the slide.

At the back stroke, when the elastic latch enters the opening 11 in the housing, the tip 25' moves upward because of its restoring force, and hits the flat wall 13 which restricts further movement of the slide (FIG. 2).

The spring unit 22 includes a support means that comprisis a plate 29 and pins 201 protruding from the plate 29, and compression springs 202 positioned over each pin 201. Blind holes 28 in the slide 21 receive the spring unit 22.

The set of funnel-shaped adapters consists of a number of the adapters of varying size for attaching the housing 10 to different size canisters in which the granular materials are sold or stored. Each adapter 30 of the set has a circular flange portion 31 and a conical discharge hopper portion 32 (FIG. 3). The flange portion 31 is externally threaded to provide a connection of the adapter 30 to the threaded flange of the housing 10. The flange portion of each adapter of the set has also an internal thread 33 of the same size as a standard thread of a conventional canister 40. The thread connection of the canister and the adapter can be replaced with a bayonet or any other locking mechanism.

The discharge hopper portion 32 of the adapter 30 has a shape of a cone with a discharge hole 34 at its inverted vertex. Due to the cone shape of the hopper, the canister 40 can be completely emptied of the granular material contained.

The device embodying the invention can be assembled and disassembled easily. The assembly of the device consists of four steps:

(a) inserting the spring unit 22 into the slide 21,
(b) inserting the transporting mechanism 20 into the housing 10,
(c) placing the adapter 30 in the housing 10 and
(d) connecting the adapter 30 to the canister 40.

Disassembling of the device is done in reverse order. In order to take the transporting mechanism 20 out of the housing 10, a user will press the elastic latch 25 into the hole 23 and pull the slide 21 to the left as it is shown in FIG. 5.

In order to operate the device, the canister 40 that contains the granular material, is screwed onto the adapter 30 and then turned over. In this position, the granular material pours under gravity into the hopper 32 and fills the compartment 41. The user pushes the handle 24 of the slide 21 against the force of the springs 202 and moves the slide into the passageway 16 as far as it can go. In this position, the compartment 41 registers with the discharge opening 12 in the housing and contents of the compartment 41 pours through the nozzle 15 into the receiving canister (not shown).

It can be be seen, therefore, that the inventive device provides simple dispensing of predetermined volume of a granular material from the canister in which it was purchased to the receiving container. Press-type operation of the device make it especially convenient for elderly and handicapped people. The device provides substantially hermetic conditions of storing of aromatic granular materials that provides there freshness retained. Due to the simplicity of disassemble of the device for it's washing and cleaning the device is highly hygienic.

This invention is not limited to the details shown since various modifications and structural changes are possible without departing in any way from the spirit of the present invention. What is desired to be protected is set forth in particular in the appended claims.

We claim:

1. A device for measuring and discharge a predetermined volume of granular material comprising
   a housing, a transporting mechanism and at least one a funnel-shaped adapter capable to be received in the housing and to receive a canister with said granular material;
   said housing including a material receiving opening and a material discharge opening which are interconnected by a lateral passageway, which passageway is capable to receive said transporting mechanism;
   said housing including means for receiving said adapter;
   said transporting mechanism including a reciprocable slide and at least one spring which is not affixed to said housing;
   said slide having a peripheral contour and is movable along the said passageway for delivering a predetermined volume of granular material from said receiving opening to said discharge opening;
   said slide including an opening and a lock means;
   said funnel-shaped adapter including an inverted discharged cone with a hole at its vertex and is releasably secured in said housing;
   said locking means comprising a latch cantilevered from a wall of said opening of said slide and having a tip which protrudes out of a contour of said slide.

2. The device according to claim 1, wherein said latch can be pressed into said opening of said slide, and returns to its original position after being released.

3. The device according to claim 2, wherein said spring unit includes at least one compression spring and a supporting means for said spring.

4. The device according to claim 3, wherein said supporting means is made integrally with said housing.

5. The device according to claim 3, wherein said funnel-shaped adapter includes means for receiving a predetermined type of canister with the granular material.

6. The device according to claim 3, wherein said funnel-shaped adapter is made integrally with said canister.

7. The device according to claim 1, wherein said housing includes a sealing means between said housing and said adapter.

8. A device according to claim 1, wherein said housing includes a sealing means between said housing and said slide.

9. A device as defined in claim 7, wherein said housing includes also a sealing means between said housing and said slide.

* * * * *